Aug. 21, 1928.
W. E. JONES
CONVEYER
Filed Oct. 11, 1926   3 Sheets-Sheet 1
1,681,859
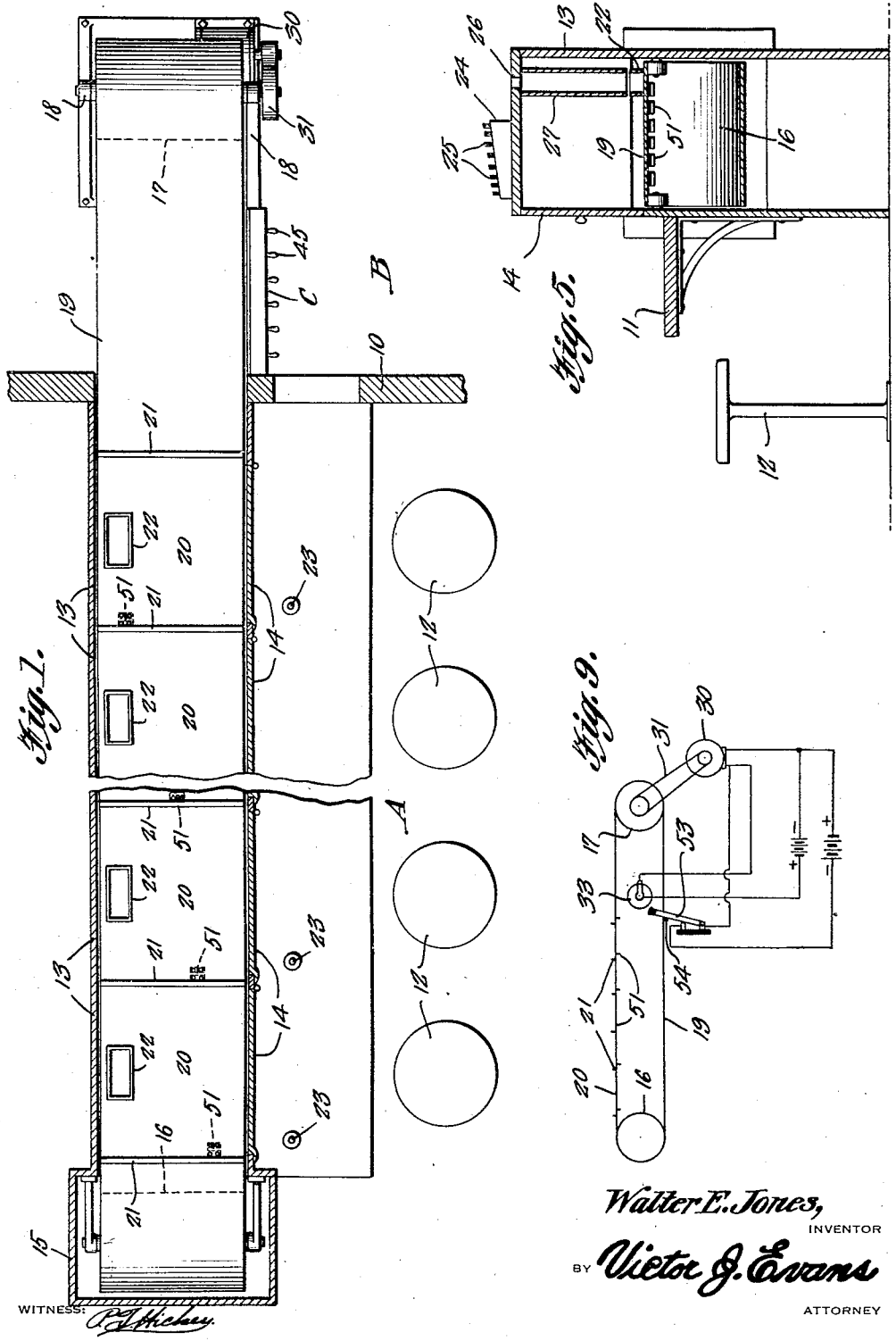
Walter E. Jones,
INVENTOR
BY Victor J. Evans
ATTORNEY

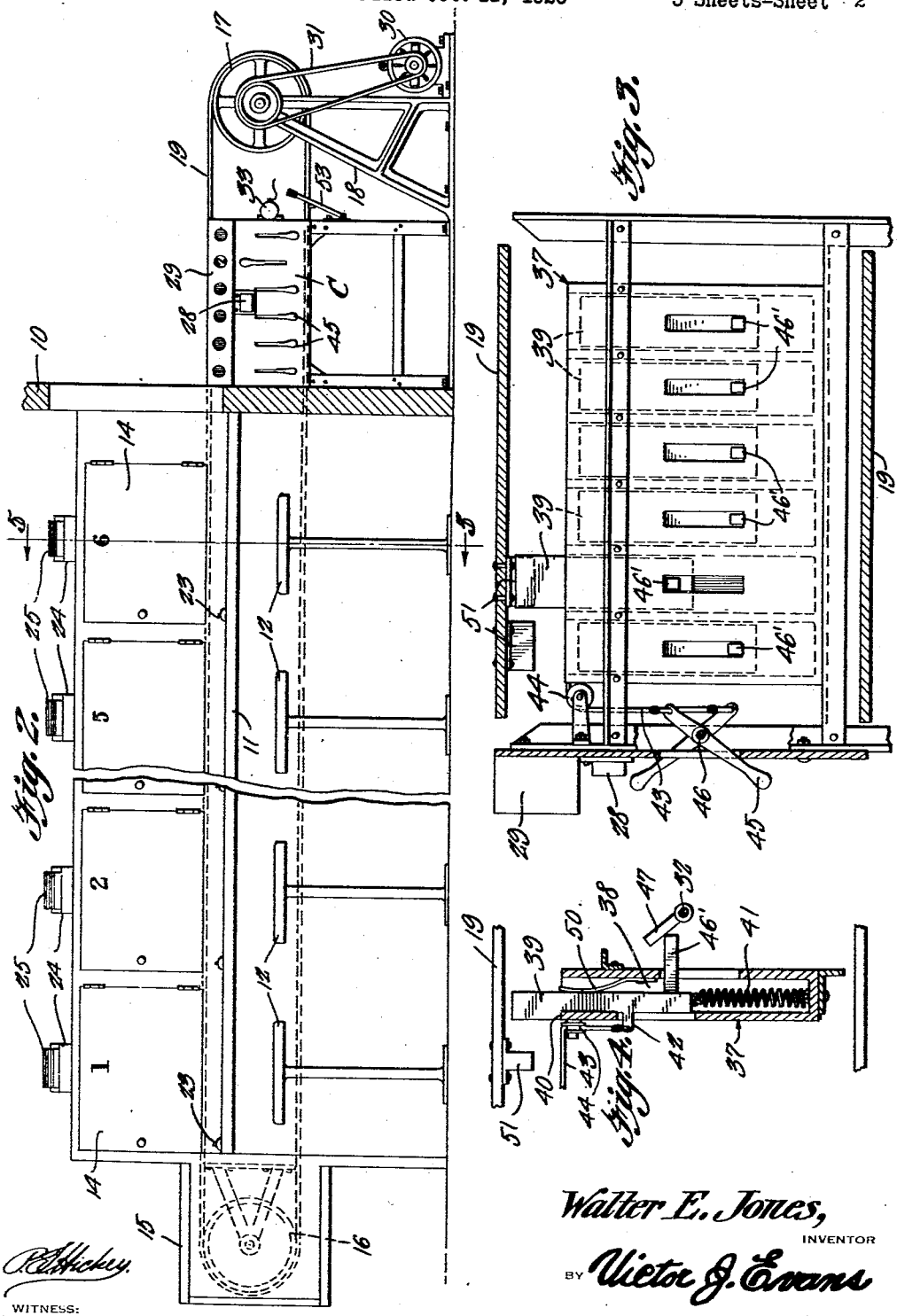

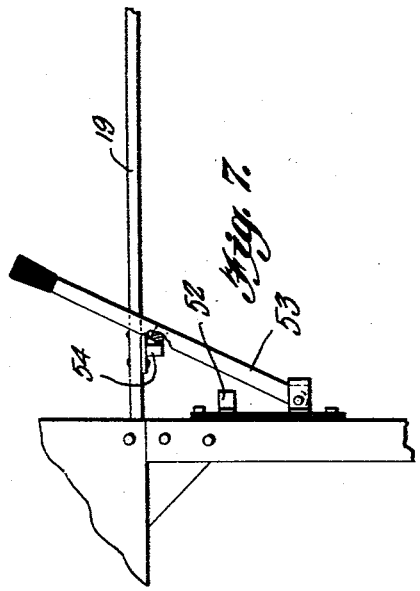
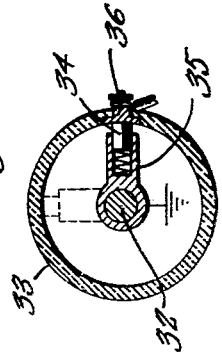
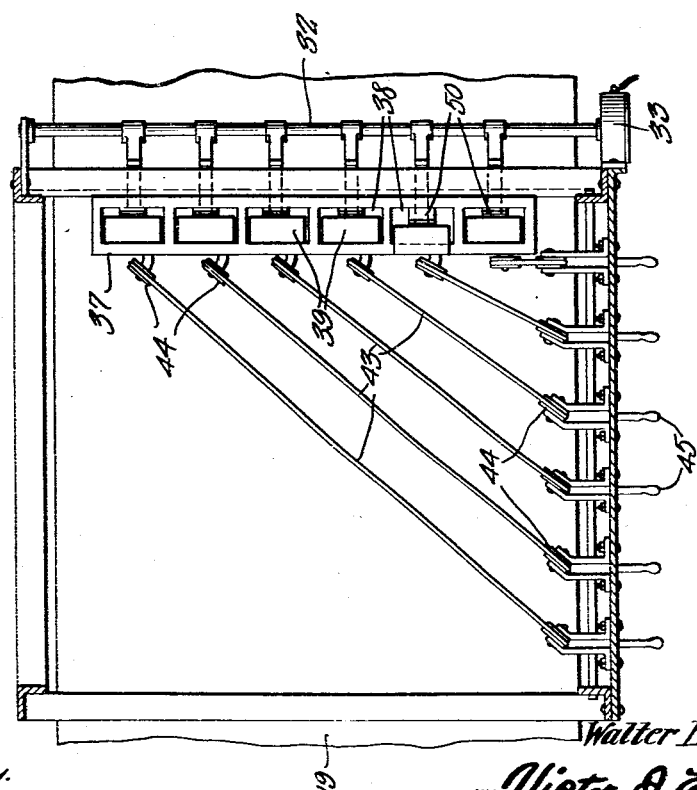

Patented Aug. 21, 1928.

1,681,859

UNITED STATES PATENT OFFICE.

WALTER E. JONES, OF LYNCHBURG, VIRGINIA.

CONVEYER.

Application filed October 11, 1926. Serial No. 140,947.

This invention comprehends the provision of a novel construction of means for serving orders in a restaurant or the like, and wherein the orders are filled in the kitchen and delivered on an endless carrier to the customer sitting along side of a table or counter, the movements of the carrier being controlled from within the kitchen.

In carrying out the invention I contemplate the provision of electrical means for operating the carrier, together with means for automatically opening the circuit to stop the carrier at a predetermined place, so that the order will be served to the proper party occupying a particular place or location along the counter.

It is the purpose of the present invention to provide means for accepting orders, filling and serving orders to customers without the services of a waiter or counter man, and all of which service is performed within the kitchen.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a plan view partly in section.

Figure 2 is a view in elevation.

Figure 3 is a sectional view through the annunciator and showing the means for controlling the movement of the endless conveyor in one direction.

Figure 4 is a fragmentary sectional view through Figure 3 showing in detail one of the manually controlled trip elements employed to stop the conveyor at a particular point in its travel.

Figure 5 is a sectional view on line 5—5 of Figure 2.

Figure 6 is a horizontal plan view partly in section of the manually controlled means for operating the endless conveyor.

Figure 7 is a detail view of the switch included in the circuit and operated to control the movement of the conveyor in one direction.

Figure 8 is a sectional view through the rotary switch.

Figure 9 is a diagrammatic view.

Referring to the drawings in detail A indicates generally the restaurant, lunch room or the like, while B indicates the kitchen thereof, the dividing wall being indicated at 10. Arranged within the restaurant is a counter or table 11 along which is arranged a plurality of seats 12, each seat being disposed immediately in advance of a compartment 13 disposed above and at the rear of the counter 11 as clearly shown in Figure 5. These compartments are numbered in consecutive order from one end of the counter to the other as illustrated in Figure 2, and each compartment includes a hinged door 14 adapted to be opened by the customer to remove the order from the compartment at the proper time. Arranged at one end of the counter is a box-like casing 15 in which is arranged a pulley 16, while a similar pulley 17 is arranged in the kitchen and journaled on a suitable bracket 18. Trained over these pulleys is an endless conveyor 19, which is divided off in sections 20 by transverse strips 21 as shown in Figure 1. The area of each section is equivalent to the area of the compartments 13, so that each section will properly fit within the compartments, it of course being understood that the conveyor passes through the compartments when operated in a manner to be hereinafter described. Carried by each section 20 is a small container 22 which is adapted to receive the order of the customer and also the money therefor in a manner to be hereinafter described. Arranged along the counter are push buttons or the like 23, there being one for each seat 12 and its corresponding compartment 13, while arranged upon each compartment is a box or container 24 which is adapted to receive a plurality of cards or the like 25. Each of these cards contains an order of foodstuffs, and when the customer occupies one of the seats 12, he removes the cards 25 from the container 24, and makes his selection of the particular card he desires to use. The remaining cards are then placed back in the container 24, and the single card retained together with the money covering the cost of said order are dropped through a slot 26 in the top of the particular compartment 13, passing down through a tube or chute 27 arranged within the compartment in align with the container 22, so that the order card and money are ultimately deposited in the container 22. The price of each order is marked on each card, so that the customer will readily know the amount of money to be deposited with any particular order. After this has been done, the customer presses one of the push buttons 23, thereby closing the circuit to an annunciator indicated generally at C. This annunciator includes a buzzer 28 to attract the attention of the cook or attendant in the kitchen B, while at the same time a signal of any suitable character indicated at 29 is operated to inform the cook or attendant what particular compartment 13 is being used in the other room. These signals 29 are correspondingly numbered with the compartments 13. The cook or attendant then operates the endless conveyor 19, moving the upper run of the latter in the direction of the kitchen until the particular section thereof and its container 22 reaches a position directly above the annunciator, in which position the order can be easily removed from the particular container 22. The order is then filled and placed upon the same section of the conveyor, and the latter operated to move in an opposite direction until the order reaches the particular compartment 13, in front of which the customer is seated.

The conveyor is operated by an electric motor 30 which is connected to the shaft of the pulley 17 by means of a belt 31, and this motor is included in circuit with a rotary switch associated with a rock shaft 32 clearly shown in Figure 6. This shaft is journaled in suitable bearings and arranged at one side of the annunciator C, the switch associated therewith including a stationary casing of insulated material 33 and a spring pressed movable contact 34 which slides in a tubular member 35 carried by the shaft 32. Arranged on the casing 33 is a stationary contact 36, and when the shaft 32 is rocked in a direction to bring the movable contact 34 into engagement with the contact 36 as shown in Figure 8, the circuit is closed to the motor 30 as will be readily understood. The conveyor is then put into operation and moved in the direction of the kitchen for the purpose above stated, but is automatically stopped when the particular section carrying the order and money reaches a position directly above the indicator C.

For this purpose I provide a plurality of trips, one for each compartment 13, with means for selectively setting said trips to open the circuit to the motor 30 at a predetermined period. Arranged at one side of the shaft 32 is a casing 37 divided into pockets or compartments 38, there being one compartment for each trip indicated at 39. These trips are in the nature of plungers as clearly shown in Figure 4, each being provided with a shoulder 40 adapted to engage the upper edge of the casing 37, whereby the trip is supported in a set or active position. The lower end of each trip is connected by a spring 41 which normally holds the trip lowered within its pocket in an inactive position, while projecting from each trip is an arm 42 which is connected with the adjacent end of a flexible element or cable 43. All of these cables are trained over suitable guide pulleys 44 and extend to levers 45 arranged at the front of the annunciator as illustrated, each lever being fulcrumed at a point between its ends as at 46 and connected with the other end of the adjacent cable 43. Projecting from each trip in the direction of the shaft 32 is an arm 46', and disposed in the path of movement of these arms 46' are lugs 47 which project from the shaft 32, so that no matter which trip element 39 is elevated to an active position, the arm 46 thereof engages the adjacent lug 47, thereby rocking the shaft 32 to actuate the rotary switch, and set the conveyor in motion. The trip elements 39 are selectively elevated to active positions by means of the levers 45 at the front of the annunciator, it being manifest that by lifting any one of the levers the particular element 43 is pulled upon to lift the particular trip 39 to the position shown in Figure 4. A leaf spring 50 is arranged in each pocket or compartment 38, and presses against the particular element 39 to force the shoulder 40 thereof over the upper edge of the casing 37, in which manner the trip element is held in its active position, with the motor 30 in operation, until the trip element is returned to its normal position. For this purpose I employ a lug 51 which depends from the upper run of the endless conveyor 19, and when any particular trip element is raised to its active position, it is arranged in the path of movement of the lug 51. Consequently when the rotary switch is actuated in the manner described, and the conveyor put in motion, it travels in the direction of the kitchen until the particular section of the conveyor to be used occupies a position above the annunciator C, at which time the lug 51 engages the particular trip 39, moving it away from the upper edge of the casing 37 against the tension of the spring 50. Thereupon the spring 41 returns the trip element to its normal position, moving the arm 46 away from the lug 47 of the shaft 32, the latter gravitating to its normal position, and thereby operating the rotary switch to open the circuit to the motor 30 and automatically stop the conveyor 19.

After the order has been filled and placed upon the particular section of the conveyor 19 the cook or attendant closes a switch included in circuit with the motor 30, to again put the conveyor in motion, but moving it in an opposite direction, so that the order will be delivered into the particular compartment 13 on the counter 11. This switch includes a fixed contact 52 and a movable switch belt 53, which when moved into engagement with the contact 52 closes the circuit to the motor 30. As the upper run of the conveyor moves in the direction of the restaurant or front room A for the purpose specified, a lug 54 carried by the lower run of the conveyor is brought into engagement with the switch belt 53, to automatically separate the latter from the contact 52, and thereby stop the conveyor when the section thereof with the order reaches the particular compartment 13. By reason of the construction and arrangement of parts herein shown and described, it is manifest that a restaurant or lunch room business can be quickly and conveniently conducted from the kitchen of the establishment, and without the services of a waiter or counter man and also without the services of a cashier.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, an endless conveyor divided into sections, a plurality of compartments through which said sections are adapted to pass, means including an electric motor for moving the conveyor in either direction through the compartments, means for automatically stopping the conveyor at predetermined positions when moving in one direction, and means for automatically stopping the conveyor at a predetermined position upon movement of the conveyor in an opposite direction.

2. In combination, a counter, a plurality of compartments arranged above the counter, an endless conveyor having its upper run movable through said compartments, and divided into sections, one section for each compartment, means including an electric motor for operating the conveyor in opposite directions through said compartments, means for automatically stopping the conveyor to selectively arrange any particular section thereof in a predetermined position beyond said compartments, and means for automatically stopping the conveyor when said section reaches its particular compartment incident to the reverse movement of the conveyor.

3. In combination, a counter, a plurality of compartments arranged above and at one side of the counter, an endless conveyor having its upper run movable through said compartments, and divided into sections, one section for each compartment, a container carried by each section, each compartment having a slot through which money and an order is deposited in the container for the particular compartment, means including an electric motor for operating the conveyor in opposite directions, means including a switch arranged in the circuit with said motor for moving the conveyor in one direction, means for automatically stopping the conveyor to selectively arrange any particular section thereof in a predetermined position beyond said compartments, means including a second switch for moving the conveyor in an opposite direction, and means for automatically stopping the conveyor when said particular section thereof moves into its respective compartment.

4. In combination, a counter, a plurality of compartments arranged above the counter and each having a designating character, an endless conveyor having its upper run arranged to move through said compartments, and divided into sections, one section for each compartment, a container carried by each section, each compartment having a slot through which money and an order can be passed into the container of the particular section, means including an electric motor for operating the conveyor in opposite directions, a rotary switch arranged in the circuit with said motor, means including a plurality of levers adapted to be selectively actuated to operate said switch and to automatically stop the conveyor to arrange a particular section thereof in a predetermined position beyond the compartments, a second switch arranged in said circuit and operable to move the conveyor in an opposite direction, and means for automatically opening said switch and stopping said conveyor when said particular section reaches its respective compartment.

5. In combination, a counter, a plurality of compartments arranged above the latter, each having a designating character, an endless conveyor having its upper run movable through said compartments and divided into sections, one section for each compartment, an annunciator arranged at a point remote from said compartments, a push button for each compartment and connected with the annunciator, a container carried by each section of the conveyor, each compartment having a slot, through which money and an order can be deposited in the particular container therefor, means including an electric motor for moving the conveyor in opposite directions, a switch arranged in the circuit with said motor, mechanism for automatically stopping the conveyor and including a plurality of trip elements, levers for selectively moving said elements to active positions, and simultaneously closing said switch, an abutment carried by the lower run of the conveyor for tripping said element to stop the conveyor with a particular section thereof arranged in a predetermined position beyond the compartments, and means for automatically stopping the conveyor when the particular section reaches its compartment during the reverse movement of the conveyor.

6. In combination, a counter, a plurality of compartments arranged above the latter, and each having a designating character, an endless conveyor having its upper run movable through said compartments, and divided into sections, one section for each compartment, an annunciator arranged remote from said compartments, a push button for each compartment connected with said annunciator, means including an electric motor for moving the conveyor in opposite directions, a switch included in circuit with said motor, mechanism for automatically stopping the conveyor with any particular section arranged above the annunciator, and including a plurality of normally inactive spring pressed trip elements, levers for selectively moving said elements to active positions, and pivotally mounted on the annunciator, means controlled by said elements for closing the switch to the motor, an abutment carried by the lower run of the conveyor for tripping the particular element in use, whereby said switch is automatically opened and the conveyor stopped in a predetermined position, and means for automatically stopping the conveyor incident to its movement in an opposite direction, when said particular section thereof reaches its respective compartment.

7. In combination, a counter, a plurality of compartments arranged above the counter and each having a designating character, an annunciator arranged remote from the compartments and including push buttons, one for each compartment and arranged on said counter, an endless carrier having its upper run movable through the compartments and divided into sections, one for each compartment, means including an electric motor for moving the conveyor in opposite directions, means including a switch arranged in circuit with said motor for automatically stopping the conveyor with any particular section arranged above the annunciator, a second switch included in circuit with the motor for moving the conveyor in an opposite direction, and means carried by the lower run of the conveyor for automatically opening said switch and stopping said conveyor when said particular section reaches its respective compartment.

8. In combination, an endless conveyor, means for moving the conveyor in either direction, means for automatically stopping the conveyor at predetermined positions when moving in one direction, and means for automatically stopping the conveyor at a predetermined position upon movement of the conveyor in an opposite direction.

In testimony whereof I affix my signature.

WALTER E. JONES.